US012676676B2

(12) United States Patent
    Matsuo

(10) Patent No.: US 12,676,676 B2
(45) Date of Patent: Jul. 7, 2026

(54) OPTICAL REPEATER, OPTICAL TRANSMISSION SYSTEM, AND CONNECTION METHOD OF OPTICAL REPEATER

(71) Applicant: NEC Corporation, Tokyo (JP)

(72) Inventor: Yuushi Matsuo, Tokyo (JP)

(73) Assignee: NEC CORPORATION, Tokyo (JP)

( * ) Notice: Subject to any disclaimer, the term of this patent is extended or adjusted under 35 U.S.C. 154(b) by 373 days.

(21) Appl. No.: 18/413,147

(22) Filed: Jan. 16, 2024

(65) Prior Publication Data

US 2024/0267123 A1     Aug. 8, 2024

(30) Foreign Application Priority Data

Feb. 8, 2023     (JP) ................................. 2023-017871

(51) Int. Cl.
    *H04B 10/29*        (2013.01)
    *H04B 10/079*       (2013.01)
    *G02B 6/42*         (2006.01)

(52) U.S. Cl.
    CPC ....... *H04B 10/29* (2013.01); *H04B 10/07955* (2013.01); *G02B 6/4286* (2013.01)

(58) Field of Classification Search
    None
    See application file for complete search history.

(56) References Cited

U.S. PATENT DOCUMENTS 9,729,229 B2 * 8/2017 Le Taillandier De Gabory ..........
                                              H04B 10/6164
10,686,520 B2 * 6/2020 Oda ................... H04B 10/2581
11,329,444 B2 * 5/2022 Le Taillandier de Gabory ..........
                                              H01S 3/10015
12,321,013 B1 * 6/2025 Van Vickle ............ G02B 6/255
2013/0236175 A1 * 9/2013 Sethumadhavan .........................
                                              G02B 6/29383
                                                        398/43
2014/0140694 A1 * 5/2014 Zhou ................... H04Q 11/0005
                                                        398/44

FOREIGN PATENT DOCUMENTS

WO          2022/054242 A1     3/2022

* cited by examiner

*Primary Examiner* — Jai M Lee
(74) *Attorney, Agent, or Firm* — Sughrue Mion, PLLC

(57)                ABSTRACT

An optical repeater includes: a first fan-in/fan-out (FIFO) including a first MCF connectable to a first MCF transmission path, and a first SCF group including a plurality of SCFs relevantly connected to each core of the first MCF; and a monitoring light circuit that outputs, based on a fixed loss, monitoring light being input to a first core included in the first MCF, from light being output from a first SCF being an SCF included in the first SCF group and being an SCF relevant to the first core.

10 Claims, 8 Drawing Sheets

103 OPTICAL PROCESSING CIRCUIT

203 LOOP BACK CIRCUIT

311 OPTICAL COUPLER

312 OPTICAL COUPLER

313 WSR

412

422

114 SCF

115 SCF

OPTICAL REPEATER, OPTICAL TRANSMISSION SYSTEM, AND CONNECTION METHOD OF OPTICAL REPEATER

This application is based upon and claims the benefit of priority from Japanese Patent Application No. 2023-017871, filed on Feb. 8, 2023, the disclosure of which is incorporated herein in its entirety by reference.

TECHNICAL FIELD

The present disclosure relates to an optical repeater and the like.

BACKGROUND ART

In order to expand a transmission capacity of an optical fiber transmission system, a study using a multi-core fiber (MCF) in which a plurality of cores is accommodated in one optical fiber is being advanced. The MCF is one method for expanding a transmission capacity of an optical fiber by using space division multiplexing (SDM).

Meanwhile, for an optical repeater of an optical transmission system using an MCF as a transmission path, a fan-in/fan-out (FIFO) is used in order to connect an optical component such as an optical amplifier and an optical isolator to each core of the MCF. The FIFO includes an MCF and a single-core fiber (SCF). The MCF and the SCF are connected to each other in the FIFO. One end of the FIFO is an MCF, and the other end is an SCF. The FIFO is an optical device in which cores of the MCF and cores of a plurality of SCFs are connected on a one-to-one basis. In a general optical repeater, each core of an MCF transmission path is connected to an SCF by a FIFO included in the optical repeater. The SCF of the FIFO is connected to an optical component included in the optical repeater.

In relation to the present disclosure, International Patent Publication No. WO2022/054242 describes a technique for monitoring power of a core of an MCF transmission path. When MCFs are fusion-spliced, an optical axis of an MCF is adjusted while a matching state of an optical axis of a core of an opposite MCF is confirmed. In this case, first, monitoring light is input from one core or a plurality of cores of one MCF to a core of the other MCF. In the other MCF, power of the monitoring light propagated and output through a core to which the monitoring light is input is monitored by using an optical power meter. Thereafter, an optical axis is adjusted in such a way that a connection loss of the core becomes a preferable value. In this manner, when MCFs are fusion-spliced, power of monitoring light is monitored for each core.

In an optical repeater that includes a FIFO for input/output and is connected to an MCF transmission path, light being input to the optical repeater is output to outside of the optical repeater via an optical component inside the optical repeater. The optical component is, for example, an optical amplifier. In the optical amplifier, generally, amplification characteristics of an optical signal are controlled by a control circuit included in an optical repeater. Output of an optical amplifier included in a general optical repeater is controlled in such a way as to be fixed. In this case, a ratio of power of amplified light to input power of light being input to the optical amplifier is not fixed. Therefore, even when power of light amplified in the optical amplifier is measured outside the optical repeater, a change of a level of light in the optical amplifier is not fixed, and therefore, from power of light being output from the optical repeater, it is difficult to recognize power of light being input to the optical repeater. When, for example, one MCF of an optical repeater including two MCF interfaces is fusion-spliced with an MCF transmission path, power of light being input from the MCF transmission path to the optical repeater varies with optical axis adjustment of a connection point. However, inside the optical repeater, output power of the optical repeater is controlled, and therefore, in the output power of the optical repeater, a variation due to the optical axis adjustment is not reflected. Therefore, it is difficult to recognize a loss in the connection point by monitoring optical power being output from the other MCF of the optical repeater.

In a path inside an optical repeater, an optical component (an optical isolator or the like) in which a loss is different to a large extent according to a traveling direction of light may be disposed. Also, when such an optical component is present on a path of a core through which light used for optical axis adjustment is propagated, power of light at a time of optical axis adjustment is decreased, and therefore it may be difficult to accurately measure a connection loss in a connection point.

An object of the present disclosure is to provide a technique for recognizing a loss in a connection point when an MCF of an optical repeater including an MCF interface and an MCF transmission path are connected to each other.

SUMMARY

An optical repeater according to the present disclosure includes:

a first fan-in/fan-out (FIFO) including a first multi-core fiber (MCF) connectable to a first MCF transmission path and a first single-core fiber (SCF) group including a plurality of SCFs relevantly connected to cores of the first MCF; and a monitoring light circuit that outputs, based on a fixed loss, monitoring light being input to a first core included in the first MCF, from light being output from a first SCF being an SCF included in the first SCF group and being an SCF relevant to the first core.

A connection method of an optical repeater according to the present disclosure includes procedures of:

inputting monitoring light to a first MCF transmission path, through which the monitoring light is transmitted, of an optical repeater including a first FIFO including a first MCF connectable to the first MCF transmission path and a first SCF group including a plurality of SCFs relevantly connected to cores of the first MCF, and a monitoring light circuit that outputs monitoring light being input to a first core included in the first MCF, from light being output from a first SCF being an SCF included in the first SCF group and being an SCF relevant to the first core;

measuring power of the monitoring light being output from the monitoring light circuit; and performing, by using the power of the monitoring light, optical axis adjustment to the first MCF connectable to the first MCF transmission path.

The present disclosure enables recognizing a loss in a connection point when an MCF of an optical repeater including an MCF interface is connected to an MCF transmission path.

BRIEF DESCRIPTION OF THE DRAWINGS

Exemplary features and advantages of the present invention will become apparent from the following detailed description when taken with the accompanying drawings in which.

EXAMPLE EMBODIMENT

Figure 1:
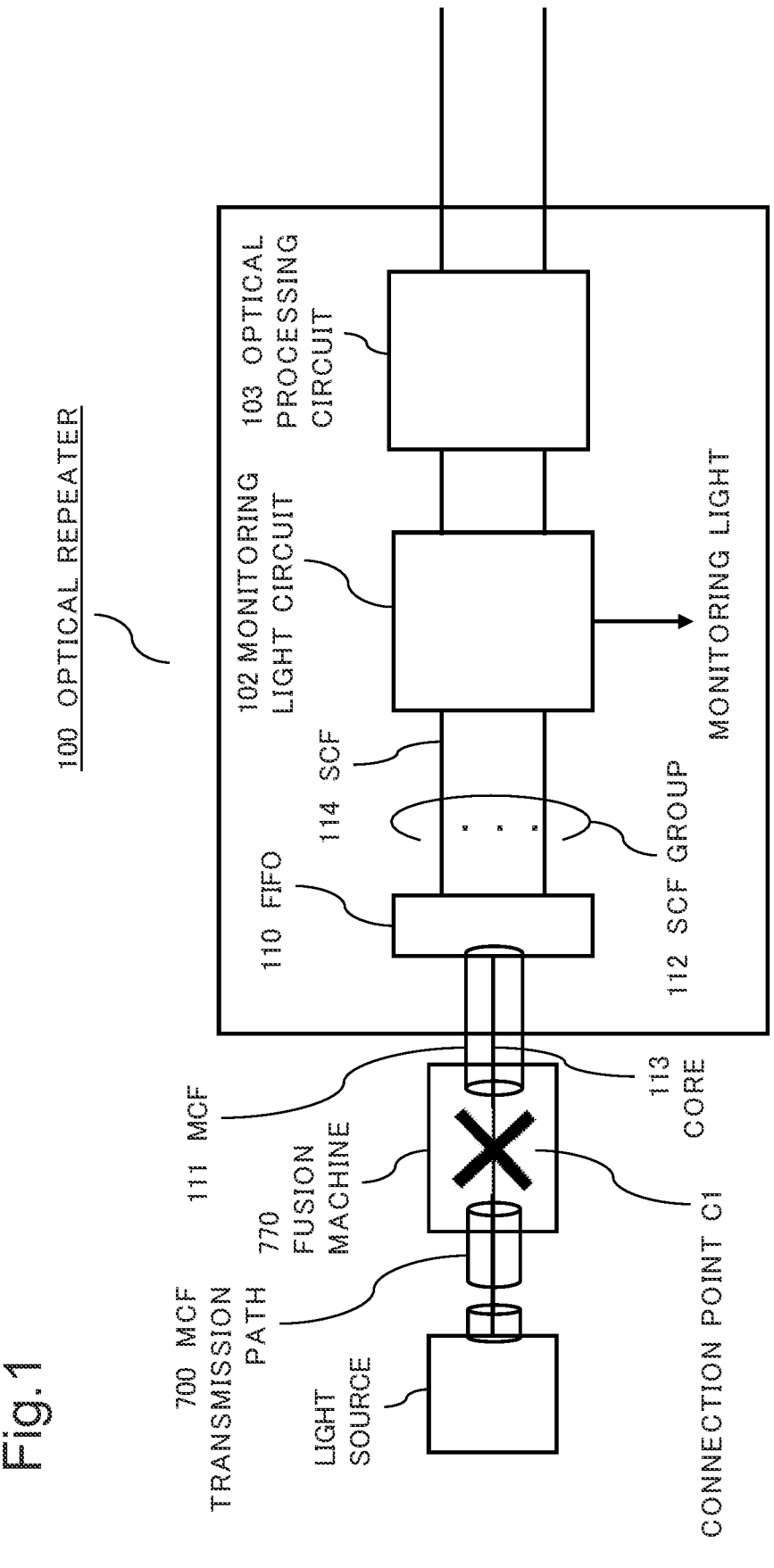
FIG. 1 is a diagram illustrating a configuration example of an optical repeater.

Example embodiments according to the present disclosure are described below with reference to the accompanying drawings. An arrow illustrated in the drawings is illustrative of a direction of a signal or the like and is not intended to limit a property of the signal or the like. According to the example embodiments and the drawings, an already-described element is assigned with the same reference sign and overlapping description may be omitted.

First Example Embodiment

FIG. 1 is a diagram illustrating a configuration example of an optical repeater 100 according to a first example embodiment of the present disclosure. The optical repeater 100 is a device that includes, as an interface, a multi-core fiber (MCF) and processes light propagating through an MCF transmission path 700. The optical repeater 100 is installed, for example, on a sea bottom as a component of a submarine cable system.

The optical repeater 100 includes a FIFO 110 (first FIFO), an optical processing circuit 103, and a monitoring light circuit 102. The FIFO 110 is one example of a fan-in/fan-out (FIFO). The FIFO 110 connects an MCF and an SCF for each core. One end of the FIFO 110 is an MCF 111 (first MCF), and the other end is an SCF group 112 (first SCF group) including a plurality of SCFs. Cores of the MCF 111 are optically connected to cores of the SCF group 112 in such a way as to be relevant on a one-on-one basis. Each SCF of the SCF group 112 is connected to an optical component included in the optical repeater 100 via the monitoring light circuit 102. The optical processing circuit 103 processes light input from the MCF 111 and outputs the processed light to an outside of the optical repeater 100. The optical processing circuit 103 is an optical circuit including, but not limited to, for example, an optical amplifier and an optical isolator.

The MCF 111 is connectable to the MCF transmission path 700 (a first MCF transmission path) in a connection point C1 outside the optical repeater 100. Connection to an MCF is made based on optical axis adjustment and fusion by a fusion machine 770. The optical adjustment is performed in such a way that power of monitoring light passing through the connection point C1 is measured and, for example, a loss in the connection point C1 is minimized. The monitoring light is light used for optical axis adjustment in the connection point C1. The fusion machine 770 may perform optical axis adjustment and fusion splicing between the MCF transmission path 700 and the MCF 111, by using power of monitoring light measured by an optical power meter. Also, when each fusion point illustrated in the following drawings is connected, the fusion machine 770 is usable, similarly to FIG. 1.

Monitoring light is input, via the connection point C1, from the MCF transmission path 700 to the FIFO 110. Signal light wavelength-multiplexed with monitoring light may be input to the MCF transmission path 700. The signal light is light of a wavelength different from the monitoring light and is, for example, light including user data. The monitoring light is input to an SCF 114 (first SCF) via the MCF transmission path 700 and a core 113 (first core) of the MCF 111. The SCF 114 is one SCF of the SCF group 112. The monitoring light circuit 102 outputs monitoring light from light input from the core 113 to the SCF 114. The monitoring light circuit 102 is configured in such a way as to have a known fixed loss with respect to monitoring light.

When the MCF transmission path 700 and the MCF 111 being one end of the FIFO 110 are connected in the connection point C1, an optical axis between the MCF transmission path 700 and the MCF 111 is adjusted while monitoring light is input to the core 113 from any core in the MCF transmission path 700. The optical axis adjustment is preferably performed in such a way that a connection loss in the connection point C1 is minimized. Each of optical axes of a plurality of cores is adjusted between the MCF transmission path 700 and the MCF 111 and thereby, an optical axis in the connection point C1 may be adjusted in such a way as to reduce a variation in each connection loss of different cores.

The monitoring light circuit 102 outputs monitoring light from light propagating through the core 113 and the SCF 114. The FIFO 110 is a passive component for connecting the MCF 111 and the SCF group 112 on a core unit basis. Therefore, a variation in power of monitoring light output from the monitoring light circuit 102 is relevant to a variation in a loss of monitoring light in the connection point C1. Power of monitoring light output from the MCF transmission path 700 in the connection point C1 is measurable, and also losses in FIFO 110 and the monitoring light circuit 102 are previously measurable during production of the optical repeater 100.

Based on such a configuration, the optical repeater 100 enables to recognize a loss in the connection point C1 when the MCF 111 of the optical repeater 100 including an MCF interface is connected to the MCF transmission path 700. In other words, the optical repeater 100 enables to recognize a loss in the connection point C1 when the optical repeater 100 including an MCF as an interface is connected to the MCF transmission path 700.

The configuration of the optical repeater 100 can be also described as follows. A relevant reference sign of a component in FIG. 1 is described in parentheses. The optical repeater 100 includes a first FIFO (110) and a monitoring light circuit (102). The first FIFO (110) includes a first MCF (111) connectable to a first MCF transmission path (700) and a first SCF group including a plurality of SCFs relevantly connected to cores of the first MCF (111). The monitoring light circuit (102) outputs, based on a fixed loss, from light output from a first SCF (114), included in the first SCF group (112), being an SCF relevant to a first core (113) included in the first MCF (111), monitoring light input to the first core (113). In such a configuration, a variation in power of monitoring light output from the monitoring light circuit (102) is relevant to a variation in a loss of monitoring light in the connection point C1. Therefore, the optical repeater (100) enables to recognize a loss in a connection point when the optical repeater (100) including an MCF as an interface is connected to the first MCF transmission path (700).

In contrast, a common optical repeater does not include the monitoring light circuit 102 that outputs, based on a fixed loss, monitoring light passing through the FIFO 110. Therefore, it is necessary to measure, outside an optical repeater, power of monitoring light after passing through an optical processing circuit such as an optical amplifier in which a change in optical power in input/output is not fixed. Accordingly, it is difficult for a common optical repeater to recognize a loss of monitoring light in a connection point when the optical repeater and an MCF transmission path are connected.

Second Example Embodiment

Figure 2:
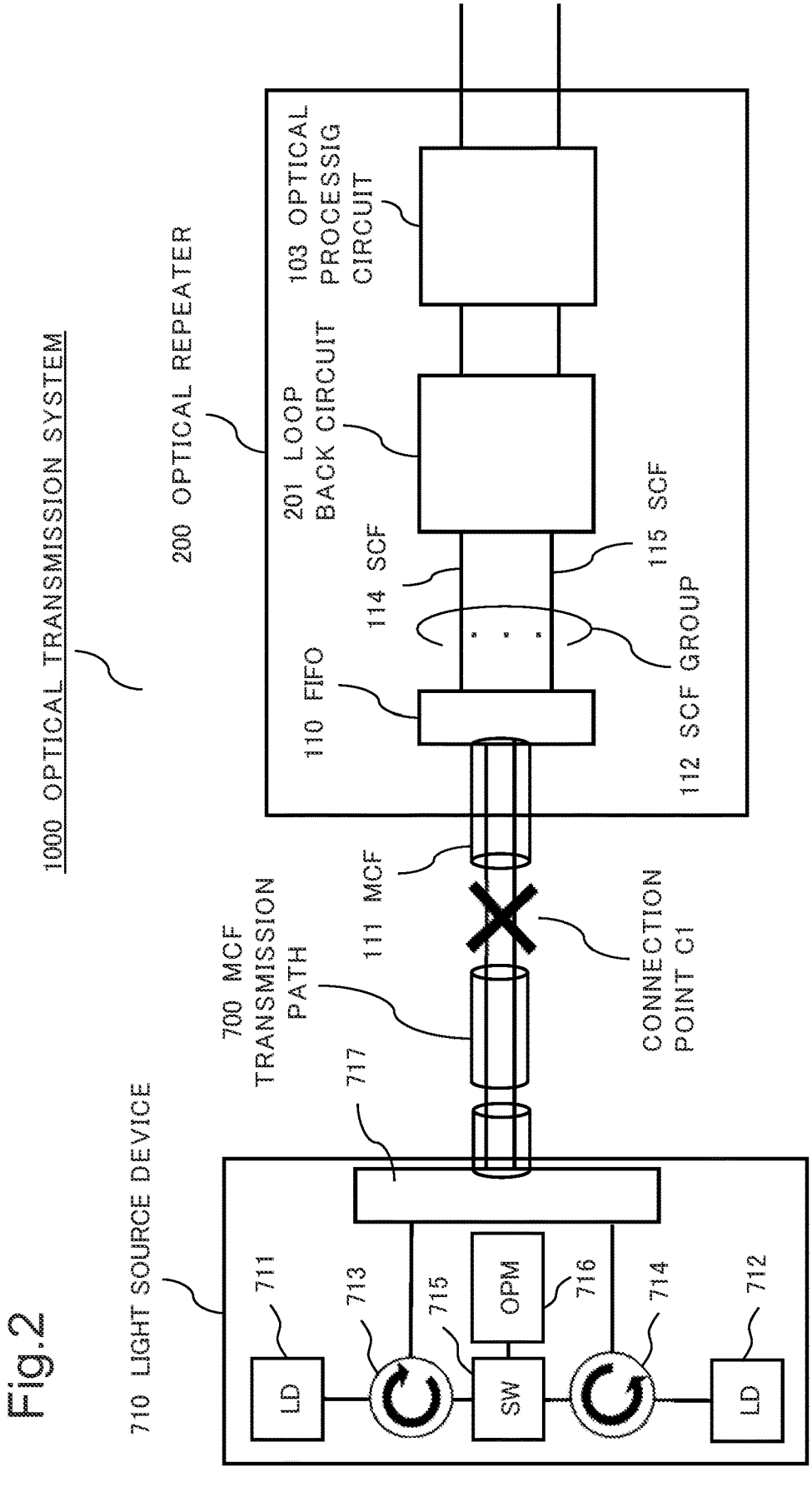
FIG. 2 is a diagram illustrating a configuration example of an optical transmission system.

FIG. 2 is a diagram illustrating a configuration example of an optical transmission system 1000 according to a second example embodiment. The optical transmission system 1000 includes an optical repeater 200, an MCF transmission path 700, and a light source device 710. The optical repeater 200 is one embodiment of the optical repeater 100 described according to the first example embodiment.

The optical repeater 200 includes a FIFO 110 and a loop back circuit 201. The loop back circuit 201 loops back monitoring light from an SCF 114 and outputs the monitoring light to an SCF 115 (second SCF) being one SCF of an SCF group 112 of the FIFO 110. The loop back circuit 201 may include a well-known configuration, for example, using an optical demultiplexer and an optical multiplexer, or an optical coupler, an optical filter, and the like. The optical filter transmits only a wavelength of monitoring light. The loop back circuit 201 is one embodiment of the monitoring light circuit 102.

The optical repeater 200 is connected to the light source device 710 via the MCF transmission path 700. The light source device 710 includes LD light sources 711 and 712, optical circulators 713 and 714, an optical switch 715, an optical power meter 716, and a FIFO 717. The LD light sources 711 and 712 each are a light source for outputting monitoring light, and as a light emission element, a laser diode (LD) is used. A wavelength of the LD light source 711 is $\lambda 1$, and a wavelength of the LD light source 712 is $\lambda 2$. The $\lambda 1$ and the $\lambda 2$ are wavelengths different from each other.

Monitoring light of a wavelength $\lambda 1$ (monitoring light $\lambda 1$) output by the LD light source 711 is input to one SCF connected to the FIFO 717 via the optical circulator 713. The monitoring light $\lambda 1$ reaches the FIFO 110 of the optical repeater 200 via an MCF of the FIFO 717 included in the light source device 710, one core of the MCF transmission path 700, and the connection point C1. The monitoring light $\lambda 1$ is input to the loop back circuit 201 via the SCF 114 of the FIFO 110. The loop back circuit 201 loops back the monitoring light $\lambda 1$ from the SCF 114 to the SCF 115. The looped-back monitoring light $\lambda 1$ is input to the light source device 710 via the MCF 111 of the FIFO 110 and the connection point C1. The looped-back monitoring light $\lambda 1$ is propagated, based on a core different from the core before loop back, through the MCF 111, the MCF transmission path 700, and the FIFO 717.

In the light source device 710, the looped-back monitoring light $\lambda 1$ is input to the optical switch 715 via the optical circulator 714. The optical switch 715 is an optical switch for two inputs/one output. The optical switch 715 operates, when an optical axis of the connection point C1 is adjusted by using the monitoring light $\lambda 1$, in such a way as to guide light (i.e., the monitoring light $\lambda 1$) input from the optical circulator 714 to the optical power meter 716.

Monitoring light of a wavelength 22 (monitoring light $\lambda 2$) output by the LD light source 712 is propagated through an optical path inversely to the monitoring light $\lambda 1$ and looped-back to the light source device 710. In other words, the monitoring light $\lambda 2$ is output from the light source device 710 via the optical circulator 714 and the FIFO 717. The monitoring light $\lambda 2$ is input to the loop back circuit 201 via the MCF transmission path 700, the connection point C1, and the SCF 115. The loop back circuit 201 loops back the monitoring light $\lambda 2$ from the SCF 115 to the SCF 114. The looped-back monitoring light $\lambda 2$ is input to the light source device 710 via the FIFO 110 and the connection point C1. The looped-back monitoring light $\lambda 2$ is input to the optical power meter 716 via the optical circulator 713 and the optical switch 715. The optical switch 715 operates, when an optical axis in the connection point C1 is adjusted by using the monitoring light $\lambda 2$, in such a way as to guide light (i.e., second monitoring light) input from the optical circulator 713 to the optical power meter 716.

Figure 3:
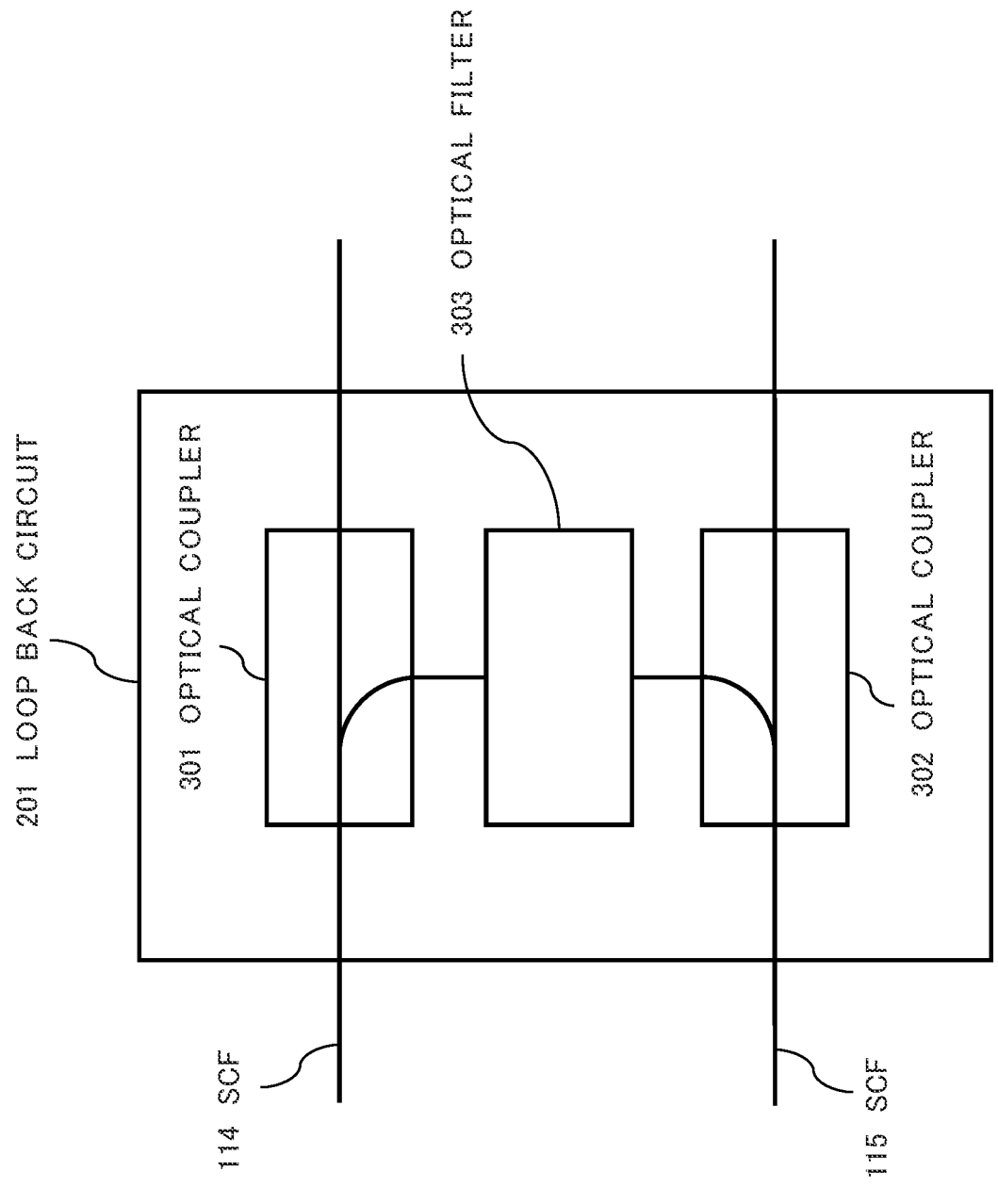
FIG. 3 is a diagram illustrating a configuration example of a loop back circuit.

FIG. 3 is a diagram illustrating a configuration example of the loop back circuit 201. The loop back circuit 201 includes optical couplers 301 and 302 and an optical filter 303. The optical couplers 301 and 302 loop back, to the SCF 115, monitoring light output from the FIFO 110 to the SCF 114 and loop back, to the SCF 114, monitoring light output from the FIFO 110 to the SCF 115. The optical filter 303 transmits only light of wavelengths $\lambda 1$ and $\lambda 2$ and blocks light (e.g., signal light) other than the transmitted light.

Based on such a configuration, the loop back circuit 201 can loop back only the monitoring light $\lambda 1$ and the monitoring light $\lambda 2$. However, the configuration of the loop back circuit is not limited to the above-described configuration. A configuration of a loop back circuit included in a common optical repeater in order to loop back monitoring light is usable as the loop back circuit 201. In order to separate monitoring light and signal light, a wavelength selective reflector (WSR) is usable. The WSR is a well-known optical component for reflecting only a specific wavelength, for example, by using a fiber grating.

Based on such a configuration, the optical repeater 200 inputs monitoring light of wavelengths different from each other to a plurality of cores and thereby, can perform optical axis adjustment between the MCF transmission path 700 and a FIFO. Monitoring light does not pass through an optical component, such as an optical amplifier, in which a variation amount of an optical level cannot be recognized. A loss in a path through which monitoring light is looped-back can be previously measured. Therefore, the optical repeater 200 including a loop back circuit can accurately recognize a loss in the connection point C1. Bands of wavelengths $\lambda 1$ and $\lambda 2$ of beams of monitoring light may be different from signal light. Thereby, an influence caused by monitoring light on an operation of an optical processing circuit in a posterior stage to a loop back circuit can be reduced.

(First Modified Example of Second Example Embodiment)

Figure 4:
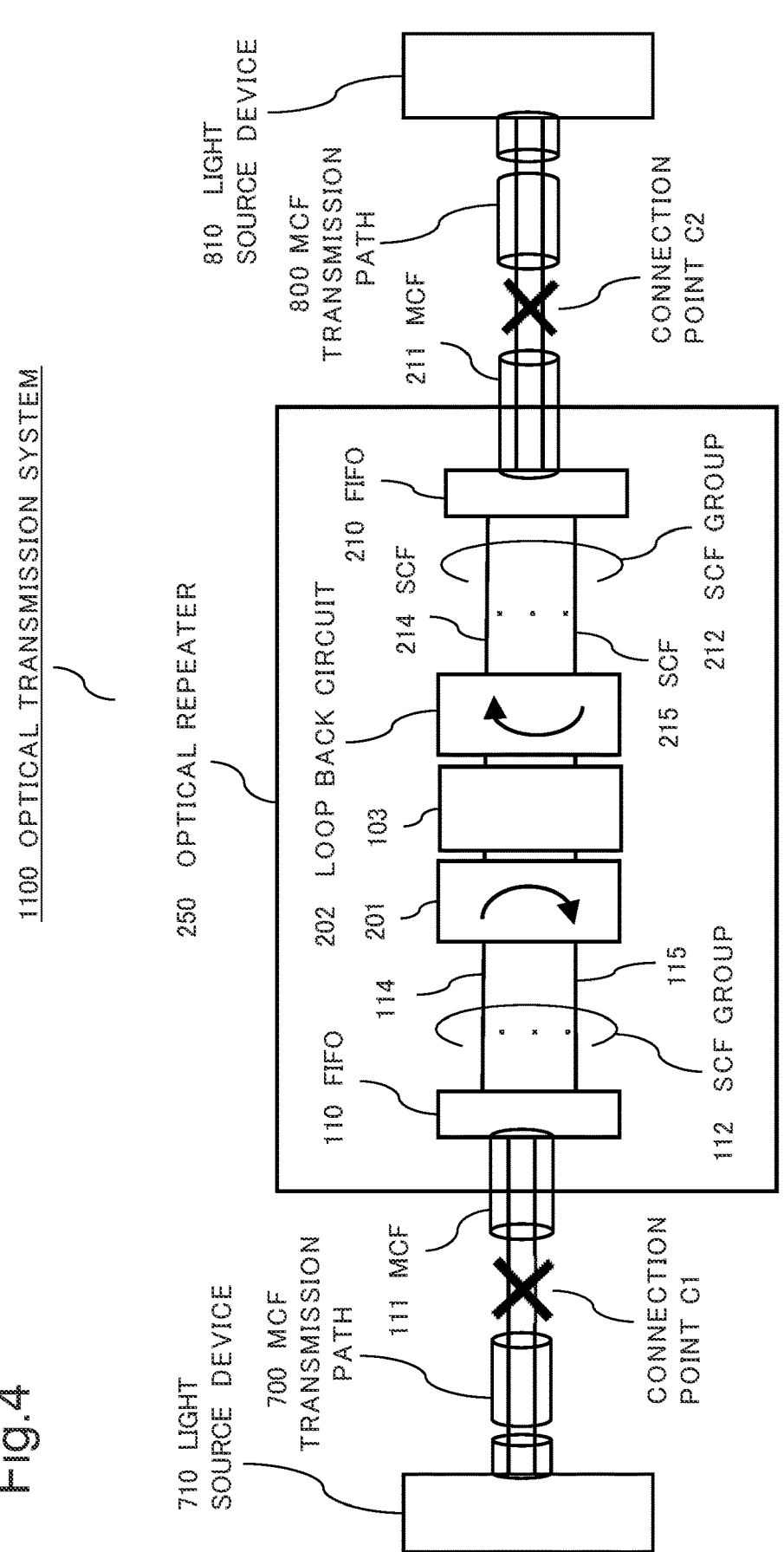
FIG. 4 is a diagram illustrating a configuration example of an optical transmission system according to a first modified example.

FIG. 4 is a diagram illustrating a configuration example of an optical transmission system 1100 being a first modified example of the second example embodiment. The optical transmission system 1100 includes an optical repeater 250, MCF transmission paths 700 and 800, and light source devices 710 and 810. The optical repeater 250 is a modified example of the optical repeater 200. The optical repeater 250 illustrated in FIG. 4 includes a FIFO 110, a FIFO 210, and loop back circuits 201 and 202. The FIFO 210 (a second FIFO) is connectable to the MCF transmission path 800 (a second MCF transmission path) being an optical transmission path different from the MCF transmission path 700. The FIFO 210 connects the MCF transmission path 800 and an inside of the optical repeater 250. An MCF 211 is an MCF forming one end of the FIFO 210. An SCF group 212 (second SCF group) is a plurality of MCFs forming the other end of the FIFO 210. SCFs 214 and 215 each are an SCF included in the SCF group 212. An optical processing circuit 103 can process, between SCFs of the SCF group 112 and the SCF group 212 each, light input from one SCF and output the processed light to the other SCF. The optical processing circuit 103 processes, for example, light input from the SCF 114 and inputs the processed light to the SCF 214. The optical processing circuit 103 processes light input from the SCF 215 and inputs the processed light to the SCF 115. In other words, the optical processing circuit 103 is disposed between the SCF group 112 and the SCF group 212 and executes predetermined processing for beams of light, different in transmission direction from each other, propagating through one pair of SCFs each.

The loop back circuit 202 loops back, to the MCF transmission path 800, monitoring light input from MCF transmission path 800 to the optical repeater 250. The loop back circuit 202 includes a configuration and a function according to the loop back circuit 201. In other words, the loop back circuit 202 can be configured, similarly to the loop back circuit 201, by using a well-known optical component such as an optical filter and an optical coupler transmitting only a wavelength of monitoring light.

The light source device 810 including a configuration similar to the light source device 710 is connected to the MCF transmission path 800, and thereby optical axis adjustment in a connection point C2 between the MCF transmission path 800 and the FIFO 210 can be performed based on a procedure similar to optical axis adjustment between the MCF transmission path 700 and the FIFO 110.

(Second Modified Example of Second Example Embodiment)

Figure 5:
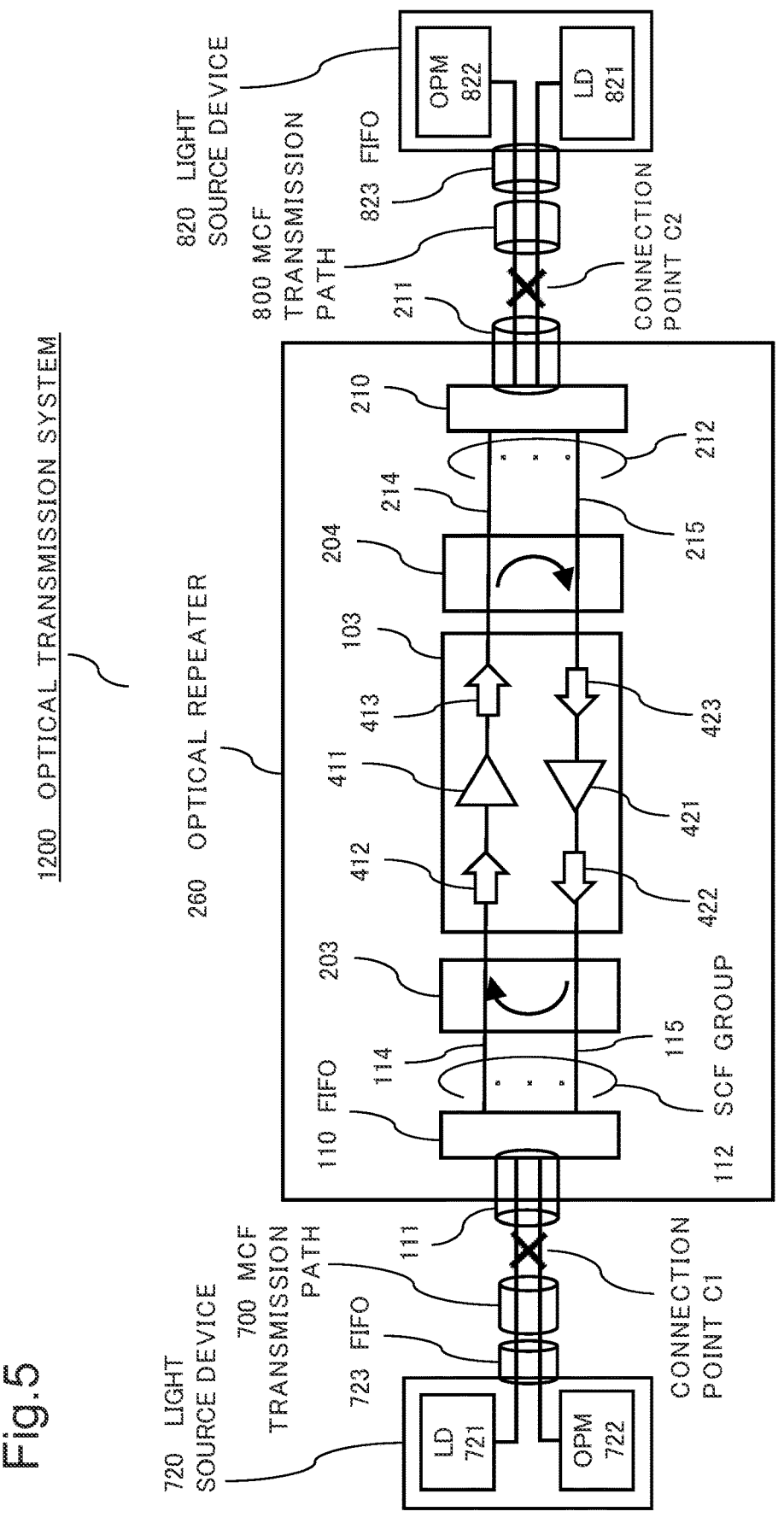
FIG. 5 is a diagram illustrating a configuration example of an optical repeater according to a second modified example.

FIG. 5 is a diagram illustrating a configuration example of an optical transmission system 1200 being a second modified example of the second example embodiment according to the present disclosure. The optical transmission system 1200 includes an optical repeater 260, light source devices 720 and 820, and MCF transmission paths 700 and 800. The optical repeater 260 includes FIFOs 110 and 210, loop back circuits 203 and 204, and an optical processing circuit 103. The optical processing circuit 103 included in the optical repeater 260 includes optical amplifiers 411 and 421 and optical isolators 412, 413, 422, and 423. The FIFO 110 connects, for each core, an inside of the optical repeater 260 and the MCF transmission path 700. The FIFO 210 connects, for each core, the MCF transmission path 800 and an inside of the optical repeater 260. In FIG. 5, with regard to the loop back circuits 203 and 204 and the optical processing circuit 103, only connection to the SCFs 114, 115, 214, and 215 is illustrated.

Optical amplifiers 411 and 421 each are an optical fiber amplifier, and gains of these optical amplifiers are controlled by a common control circuit, not illustrated, according to an input level of signal light to each optical amplifier. The optical isolators 412 and 413 are disposed on front and back sides of the optical amplifier 411. The optical isolators 423 and 422 are disposed on front and back sides of the optical amplifier 421. According to the present modified example, the optical processing circuit 103 executes predetermined processing (e.g., amplification) for input light.

The light source device 720 includes an LD light source (LD) 721, an optical power meter (OPM) 722, and a FIFO 723. The LD light source 721 generates monitoring light of a wavelength λ1 (monitoring light λ1). The monitoring light λ1 generated by the LD light source 721 is transmitted to the MCF transmission path 700 via the FIFO 723. Power of the monitoring light received via the FIFO 723 from the MCF transmission path 700 is measured by the optical power meter 722. Monitoring light of a wavelength λ1 (monitoring light λ1) is input to the FIFO 110 of the optical repeater 260 from the light source device 720 via the MCF transmission path 700 and the connection point C1. The monitoring light is generated by the LD light source 721 and input to the optical repeater 260 via the FIFO 723 and the MCF transmission path 700. The light source device 820 also includes a similar configuration, and thereby transmits monitoring light to the MCF transmission path 800 and measures power of the monitoring light received from the MCF transmission path 800.

In FIG. 5, the loop back circuit 203 loops back a part of monitoring light output from the optical isolator 422 to an input side of the optical isolator 412. In other words, the loop back circuit 203 loops back, to the MCF transmission path 800, a part of monitoring light input from the light source device 820 via the MCF transmission path 800. The loop back circuit 204 includes a configuration and a function according to the loop back circuit 203. The loop back circuit 204 loops back a part of monitoring light output from the optical isolator 413 to an input side of the optical isolator 423. In other words, the loop back circuit 204 loops back, to the MCF transmission path 700, a part of monitoring light input from the light source device 720 via the MCF transmission path 700.

Monitoring light input from the light source device 720 to the optical repeater 260 is input to the loop back circuit 204 via the optical isolator 412, the optical amplifier 411, and the optical isolator 413. In the loop back circuit 204, one part of monitoring light is looped-back and the other part of monitoring light is output to the MCF transmission path 800 via the FIFO 210 and the connection point C2. The monitoring light looped-back in the loop back circuit 204 is propagated through the MCF transmission path 800 via the optical isolator 423, the optical amplifier 421, the optical isolator 422, and the connection point C1, and optical power is measured in the optical power meter 722 of the light source device 720. Monitoring light which is not looped-back in the loop back circuit 204 is propagated to the MCF transmission path 800 via the FIFO 210 and the connection point C2, and optical power is measured in the light source device 820. The light source device 820 includes a configuration similar to the light source device 720, and transmits monitoring light to the MCF transmission path 800 and measures power of the monitoring light received from the MCF transmission path 800.

Figure 6:
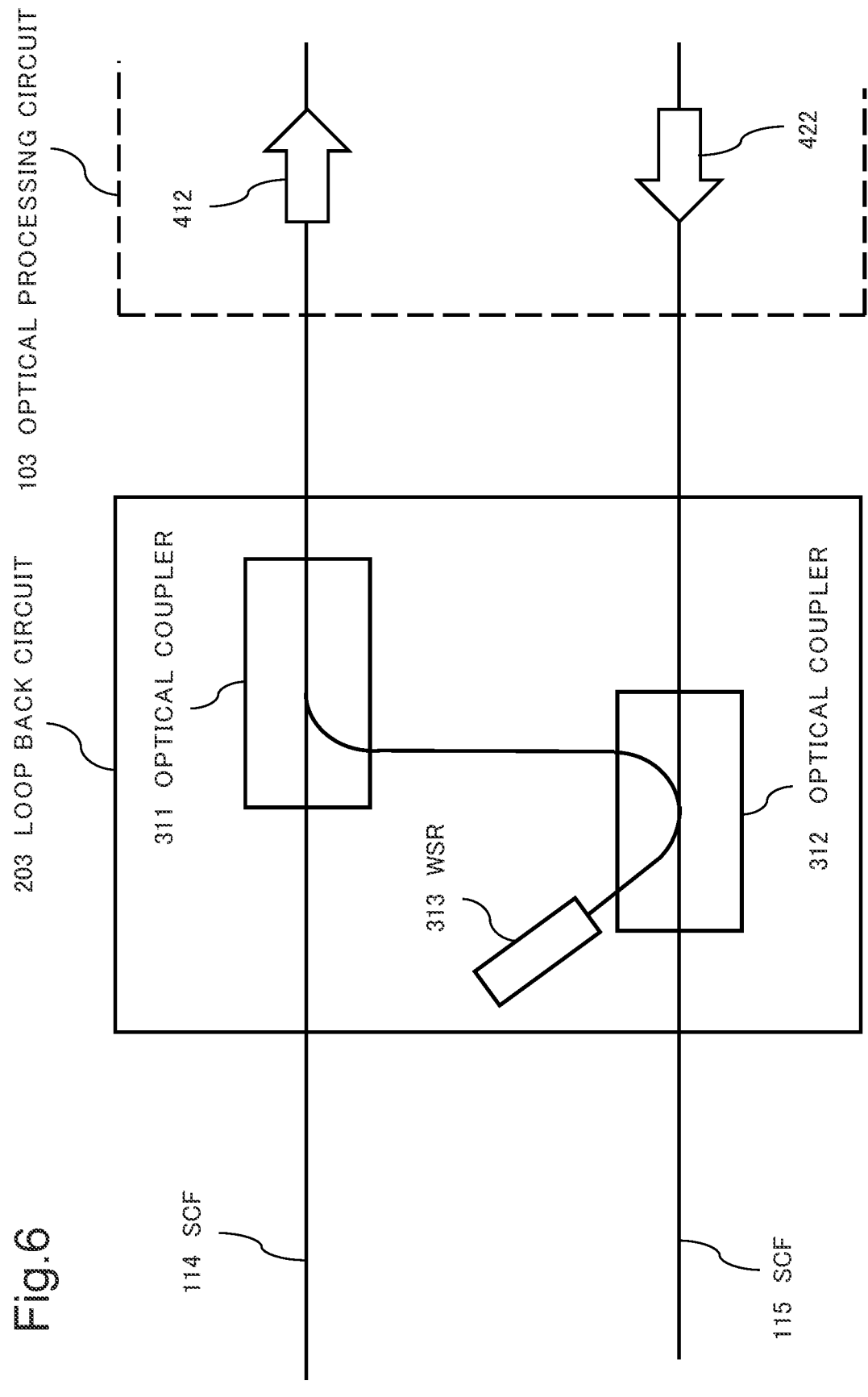
FIG. 6 is a diagram illustrating a configuration example of a loop back circuit.

FIG. 6 is a diagram illustrating a configuration example of the loop back circuit 203. The loop back circuit 203 includes optical couplers 311 and 312 and a WSR 313. The optical coupler 311 splits light output from the optical isolator 422 into two beams of light and inputs one split beam of light to the WSR 313. The WSR 313 reflects light having a wavelength of monitoring light and terminates light of a wavelength other than the wavelength of the monitoring light without reflection of the light. The monitoring light reflected by the WSR 313 is input to the optical isolator 412 via the optical couplers 311 and 312. The monitoring light output from the optical isolator 412 is transmitted, as illustrated in FIG. 5, to the MCF transmission path 800 via the optical amplifier 411, the optical isolator 413, the loop back circuit 204, and the FIFO 210. The monitoring light propagated through the MCF transmission path 800 is input to the optical power meter 822 of the light source device 820. In contrast, the other beam of light split by the optical coupler 311 is input, via the FIFO 110 and the MCF transmission path 700, to the optical power meter 722 of the light source device 720.

The loop back circuit 204 also loops back, to the MCF transmission path 700, one part of monitoring light input from the MCF transmission path 700 to the optical repeater 260, based on a configuration and an action according to the loop back circuit 203 and inputs the other part of monitoring light to the FIFO 210. The monitoring light output from the FIFO 210 is propagated through the MCF transmission path 800 and input to the optical power meter 822 of the light source device 820.

Herein, a path of monitoring light and a loss in monitoring light are considered. In the following, L12 is a loss in a path where monitoring light output from the LD light source 721 reaches the optical power meter 822 via the MCF transmission paths 700 and 800. L21 is a loss in a path where monitoring light output from the LD light source 821 reaches the optical power meter 722 via the MCF transmission paths 800 and 700. L11 is a loss of a path where monitoring light output from the LD light source 721 is looped-back by the loop back circuit 204 and returns to the optical power meter 722. L22 is a loss in a path where monitoring light output from the LD light source 821 is looped-back by the loop back circuit 203 and returns to optical power meter 822.

$$L12 = Lf(1) + La(1) + Lb(1) + Lr(1) \approx Lb(1) + Lr(1)$$

$$L21 = Lf(2) + La(2) + Lb(2) + Lr(2) \approx Lf(2) + La(1)$$

$$L11 = Lf(1) + La(1) + Lb(1) + Lw1 + La(2) + Lb(2) + Lf(2) \approx Lb(2) + Lr(2)$$

$$L22 = Lr(1) + La(1) + Lb(1) + Lw2 + La(1) + Lb(2) + Lr(2) \approx Lb(2) + Lr(2)$$

(1) and (2) in items are assigned in order to discriminate a core and a path through which monitoring light of interest is propagated. For example, (1) is a core of a path of light propagated from the SCF 114 to the SCF 214, and (2) is a core of a path of light propagated from the SCF 215 to the SCF 115. Lw1 is a loss in the loop back circuit 204, and Lw2 is a loss in the loop back circuit 203.

Lf(1) and Lf(2) each are a loss between the LD light source 721 and the MCF 111 and include a loss in the connection point C1 between the MCF transmission path 700 and the MCF 111.

Lr(1) and Lr(2) each are a loss between the LD light source 821 and the MCF 211 of the FIFO 210 and include a loss in the connection point C2 between the MCF transmission path 800 and the MCF 211.

La(1) is a loss from the SCF 114 of the FIFO 110 to input of the optical amplifier 411, and La(2) is a loss from output of the optical amplifier 421 to the SCF 115.

Lb(2) is a loss from the SCF 215 of the FIFO 210 to input of the optical amplifier 421, and Lb(1) is a loss from output of the optical amplifier 411 to the SCF 214.

Lw(1) is a loss caused when in the loop back circuit 203, monitoring light is looped-back, and Lw(2) is a loss caused when in the loop back circuit 204, monitoring light is looped-back. It is assumed that a loss inside the light source devices 720 and 820 is known and a loss between cores of an MCF and an SCF group is negligible.

The optical amplifiers 411 and 421 amplify monitoring light. Therefore, according to a gain of the optical amplifiers 411 and 421, power of monitoring light passing through these optical amplifiers varies. However, the optical amplifiers 411 and 421 are controlled on a fixed output basis, and therefore power of monitoring light measured by the optical power meters 722 and 822 is not affected by a loss leading to input of the optical amplifiers 411 and 421 and a gain of the optical amplifiers 411 and 421. In other words, for example, L12 depends on only Lb(1)+Lr(1). Therefore, when optical axis adjustment of the core (1) in the connection point C2 is performed while monitoring light output by the LD light source 721 is received by the optical power meter 822, Lb(1)+Lr(1) can be determined from a difference between output power of the optical amplifier 411 and received light power in optical power meter 822. Herein, the output power of the optical amplifier 411 has a specified value, and therefore Lb(1) can be previously measured during production of the optical repeater 260. Therefore, a connection loss of the core (1) in the connection point C2 can be determined from known output power of the optical amplifier 411, received light power of the optical power meter 822, and a known loss Lb(1). Similarly, a loss of the core (2) in the connection point C1 can be determined from output power of the optical amplifier 421, received light power of the optical power meter 722, and a loss La(2).

When optical axis adjustment of the connection points C1 and C2 is performed by using monitoring light looped-back by the loop back circuits 203 or 204, the monitoring light is amplified, after looped-back, by the optical amplifier 411 or 421 and output with fixed optical power. Therefore, also when by using looped-back monitoring light, the MCF transmission paths 700 and 800 are connected to the optical repeater 260, similar consideration as the above-described L12 and L21 is applicable. Thereby, by using output power of the optical amplifiers 411 and 421, and received light power of the optical power meters 722 and 822 and a known loss, a loss in the connection points C1 and C2 can be determined.

Third Example Embodiment

Figure 7:
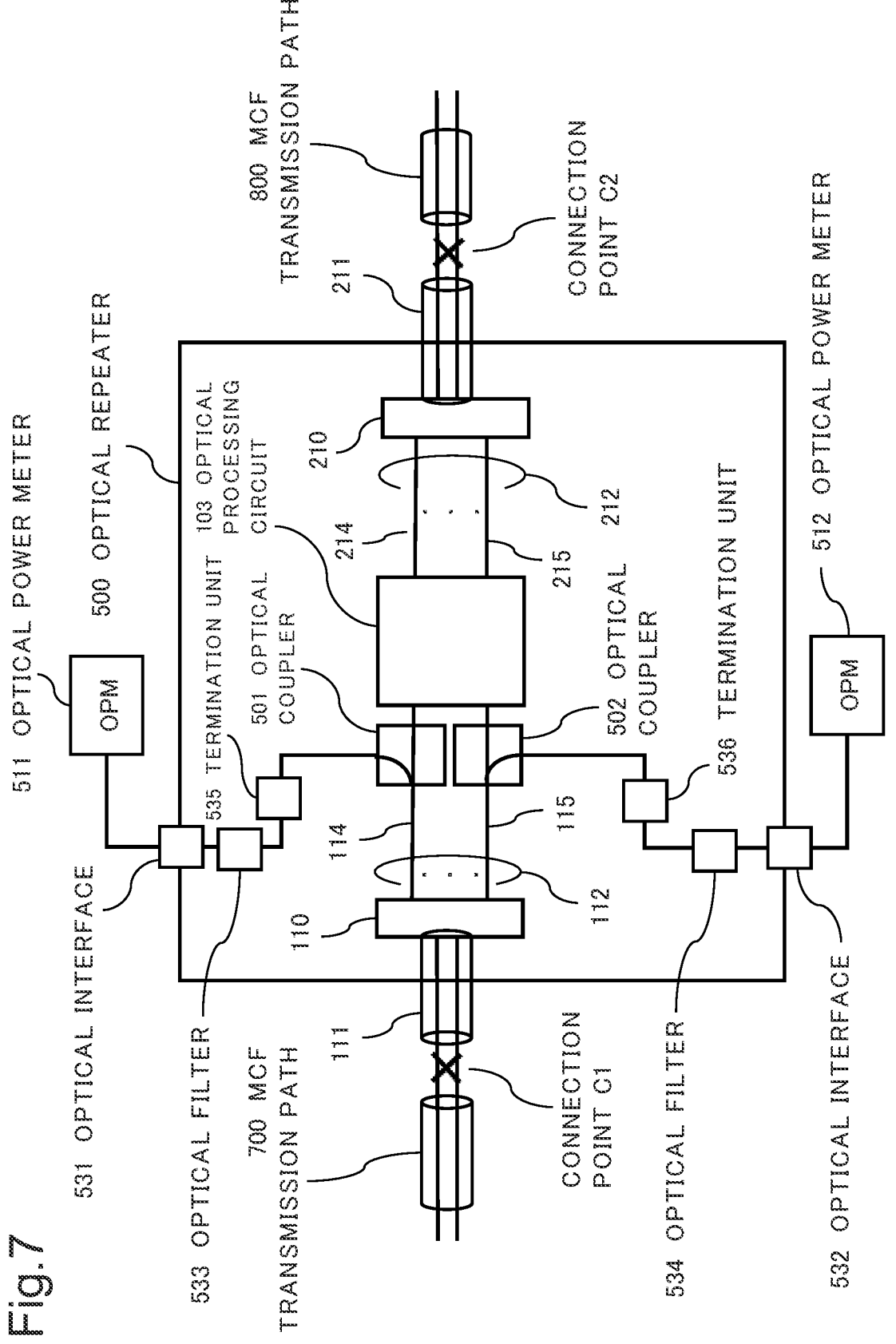
FIG. 7 is a diagram illustrating a configuration example of an optical repeater.

FIG. 7 is a diagram illustrating a configuration example of an optical repeater 500 according to a third example embodiment. The optical repeater 500 includes an optical coupler 501 between an SCF 114 and an optical processing circuit 103. An optical coupler 502 may be included between an SCF 115 and the optical processing circuit 103. The optical couplers 501 and 502 each split monitoring light input from an MCF transmission path 700 to the SCF 114 or 115. The optical coupler 501 splits, from the SCF 114, monitoring light propagating through the SCF 114 and outputs the split monitoring light to an outside of the optical repeater 500. The optical coupler 502 outputs monitoring light propagating through the SCF 115 to an outside of the optical repeater 500. Power of the monitoring light output from the optical repeater 500 can be measured by using optical power meter 511 or 512.

The optical repeater 500 including such a configuration enables to recognize a loss in a connection point C1 between the MCF transmission path 700 and the optical repeater 500. The reason is that a loss from the connection point C1 to the optical power meters 511 and 512 is fixed and can be previously measured during production or the like of the optical repeater 500.

The optical couplers 501 and 502 each may include optical interfaces 531 and 532 for connecting split monitoring light to an optical power meter. The optical interfaces 531 and 532 are, for example, an optical connector.

The optical couplers 501 and 502 each may include optical filters 533 and 534 on a path on a side where monitoring light is split to an outside of an optical repeater. The optical filters 533 and 534 transmit only light having a wavelength of monitoring light. Power of light other than monitoring light input only to the optical power meters 511 and 512 can be reduced by the optical filters 533 and 534 each.

A termination unit 535 may be further included between the optical interface 531 and the optical coupler 501. The termination unit 535 prevents unnecessary light reflected by the optical interface 531 from returning to the FIFO 110 via the optical coupler 501. In other words, the termination unit 535 reduces a reflection attenuation amount in the optical interface 531. After the optical power meter 511 finishes measuring power of monitoring light, an optical fiber split from the optical coupler 501 to the optical interface 531 is wound at a small diameter and a loss is increased, and thereby the wound optical fiber may be formed as a termination unit. A similar termination unit 536 may be also included between the optical interface 532 and the optical coupler 502. A similar configuration to the optical couplers 501 and 502 is included between the FIFO 210 and the optical processing circuit 103, and thereby a loss in a connection point C2 between an MCF 211 and an MCF transmission path 800 can be also measured.

Fourth Example Embodiment

Figure 8:
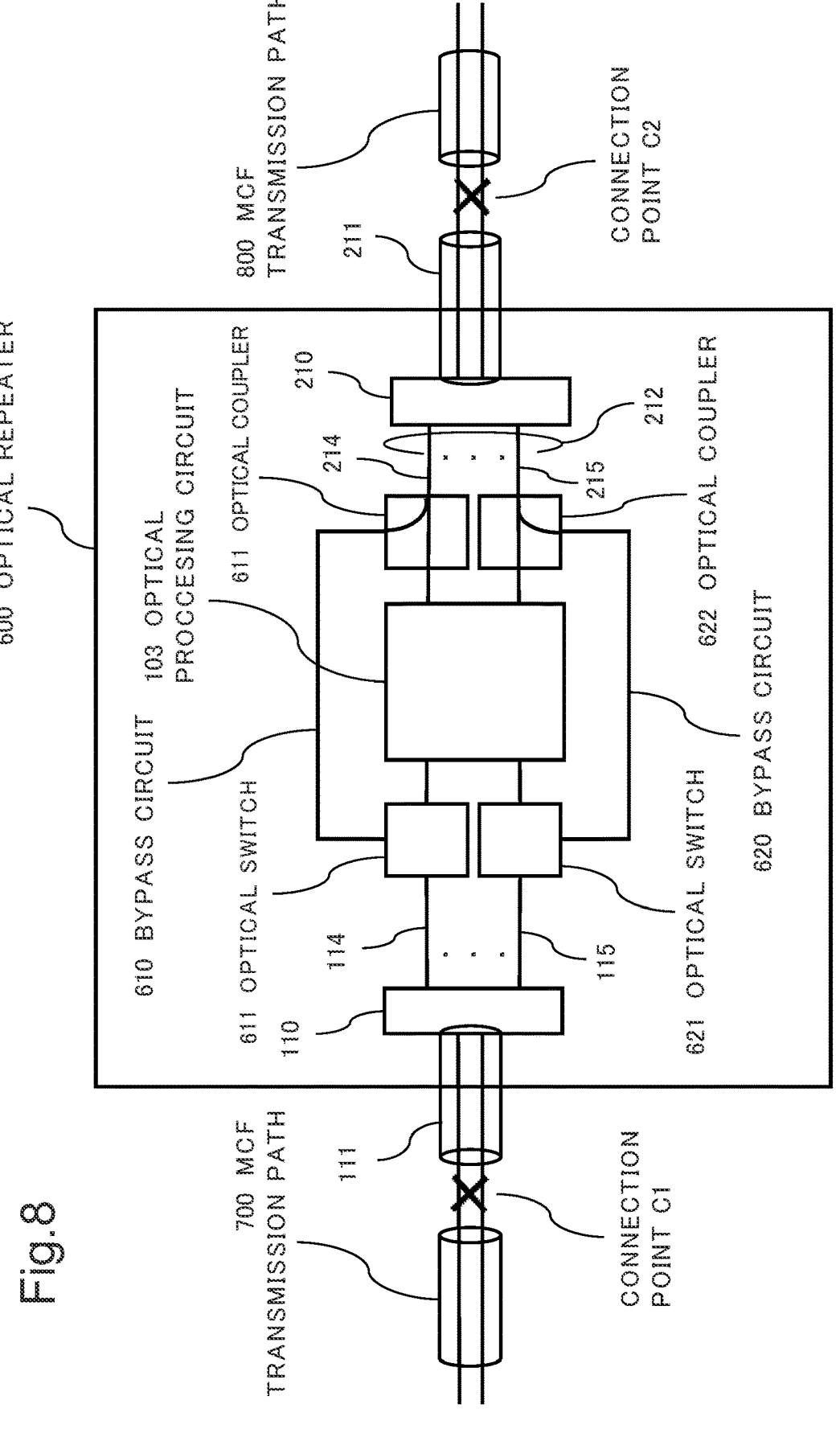
FIG. 8 is a diagram illustrating a configuration example of an optical repeater.

FIG. 8 is a diagram illustrating a configuration example of an optical repeater 600 according to a fourth example embodiment. The optical repeater 600 includes bypass circuits 610 and 620. The bypass circuits 610 and 620 can configure a bypass path for causing monitoring light to bypass the optical processing circuit 103. In other words, the bypass circuits 610 and 620 can configure a path bypassing the optical processing circuit 103 (e.g., an optical amplifier, an optical isolator, and the like).

The bypass circuit 610 includes an optical switch 611 and an optical coupler 612. The optical switch 611 switches a path of light input from an SCF 114 to a path connected to the optical processing circuit 103 or a path bypassing the optical processing circuit 103. The optical coupler 612 couples a path from the optical processing circuit 103 and a path from the optical switch 611 and connects the coupled path to an SCF 214. The bypass circuit 620 includes an optical switch 621 and an optical coupler 622. The optical switch 621 switches a path of light input from an SCF 115 to a path connected to the optical processing circuit 103 or a path bypassing the optical processing circuit 103. The optical coupler 622 couples a path from the optical processing circuit 103 and a path from the optical switch 621 and connects the coupled path to an SCF 215. Each of the SCFs 214 and 215 is an SCF (third SCF) included in an SCF group 212 (second SCF group).

The bypass circuits 610 and 620 including such a configuration are configured by using an optical switch and an optical coupler, and therefore input and output of the optical processing circuit 103 can be connected, based on a fixed and low loss, by a path bypassing the optical processing circuit 103. The configuration of the bypass circuits 610 and 620 is not limited to FIG. 8. The bypass circuits 610 and 620 may configure a path bypassing the optical processing circuit 103, by using at least either of an optical switch and an optical coupler. The bypass circuits 610 and 620 indicate one embodiment of the monitoring light circuit 102 that outputs monitoring light from light input to a core of an MCF 111 and output from the SCF 114 relevant to the core.

The optical repeater 600 including such a configuration can also recognize a loss in a connection point between an MCF transmission path 700 and the optical repeater 600. The reason is that the optical switch 611 or 621 is controlled in such a way that the bypass circuit 610 or 620 is connected, and thereby a loss between a FIFO 110 and a FIFO 210 of the optical repeater 600 has a fixed value. Therefore, the optical repeater 600 enables to recognize a loss in a connection point when the MCF transmission path 700 and the optical repeater 600 are connected to each other.

The example embodiments according to the present disclosure can be described as, but not limited to, the following supplementary notes.

(Supplementary Note 1)

An optical repeater including:

a first fan-in/fan-out (FIFO) including a first multi-core fiber (MCF) connectable to a first MCF transmission path, and a first SCF (single-core fiber) group including a plurality of SCFs relevantly connected to each core of the first MCF; and a monitoring light circuit that outputs, based on a fixed loss, monitoring light being input to a first core included in the first MCF, from light being output from a first SCF being an SCF included in the first SCF group and being an SCF relevant to the first core.

(Supplementary Note 2)

The optical repeater according to supplementary note 1, wherein the monitoring light circuit includes a loop back circuit that loops back, from the first SCF, the monitoring light to a second SCF different from the first SCF of the first SCF group.

(Supplementary Note 3)

The optical repeater according to supplementary note 1, further including:

a second FIFO including a second MCF connectable to a second MCF transmission path including a multi-core fiber and a second SCF group relevantly connected to each core of the second MCF;

an optical processing circuit that is disposed between the first SCF group and the second SCF group and executes predetermined processing on light propagating through each of a pair of SCFs different in transmission direction from each other; and a loop back circuit that loops back, in a direction of the optical processing circuit toward input of the first FIFO, light being input from the first FIFO to the optical processing circuit and output from the optical processing circuit to the second FIFO.

(Supplementary Note 4)

The optical repeater according to supplementary note 2 or 3, wherein the loop back circuit loops back only light having a wavelength of the monitoring light.

(Supplementary Note 5)

The optical repeater according to supplementary note 1, wherein the monitoring light circuit includes an optical coupler that splits, from the first SCF, the monitoring light propagating through the first SCF and outputs the split monitoring light to outside of the optical repeater.

(Supplementary Note 6)

The optical repeater according to supplementary note 5, wherein

13

14 the optical coupler includes an optical filter that outputs only light having a wavelength of the monitoring light to outside of the optical repeater, and the monitoring light circuit includes an optical interface for connecting the split monitoring light to an optical power meter and a termination unit that reduces, when the optical power meter is not connected to the optical interface, a reflection attenuation amount of the optical interface.

(Supplementary Note 7)

The optical repeater according to supplementary note 1, further including:

a second FIFO including a second MCF connectable to a second MCF transmission path including a multi-core fiber, and a second SCF group relevantly connected to each core of the second MCF; and an optical processing circuit that is disposed between a third SCF being one SCF of the second SCF group and the first SCF and executes predetermined processing on input light, wherein the monitoring light circuit is connectable, based on a fixed loss, between the first SCF and the third SCF by using a bypass circuit bypassing the optical processing circuit.

(Supplementary Note 8)

The optical repeater according to supplementary note 7, wherein the monitoring light circuit configures, between the first SCF and the third SCF, a bypass circuit that bypasses the optical processing circuit, by using at least one of an optical switch and an optical coupler.

(Supplementary Note 9)

An optical transmission system including:

a light source device including a light source that inputs, via the first MCF transmission path, the monitoring light to the first FIFO and an optical power meter that measures power of the monitoring light that is looped-back to the first FIFO and propagated through the first MCF transmission path;

the optical repeater according to any one of supplementary notes 1 to 8; and a fusion machine that performs optical axis adjustment and fusion splicing between the first MCF transmission path and the first MCF, by using power of the monitoring light measured by the optical power meter.

(Supplementary Note 10)

A connection method of an optical repeater including:

inputting monitoring light to a first MCF transmission path of an optical repeater including a first fan-in/fan-out (FIFO) including a first multi-core fiber (MCF) connectable to the first MCF transmission path and a first single-core fiber (SCF) group including a plurality of SCFs relevantly connected to each core of the first MCF, and a monitoring light circuit that outputs monitoring light being input to a first core included in the first MCF, from light being output from a first SCF being an SCF included in the first SCF group and being an SCF relevant to the first core;

measuring power of the monitoring light being output from the monitoring light circuit; and performing, by using the power of the monitoring light, optical axis adjustment to the first MCF connectable to the first MCF transmission path.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims. The present disclosure is applicable, for example, to an optical submarine cable system and an onshore optical transmission system. Description of an optical repeater according to the example embodiments and description of a connection procedure of an MCF transmission path also disclose an optical transmission system including an MCF transmission path and a connection method of the optical repeater.

The configurations according to the example embodiments are not necessarily exclusive to each other. The actions and the advantageous effects according to the present disclosure may be achieved by a configuration based on a combination of the whole or part of the above-described example embodiments.

REFERENCE SIGNS LIST

100 Optical repeater
102 Monitoring light circuit
103 Optical processing circuit
110 FIFO
111 MCF
112 SCF group
113 Core
114, 115 SCF
200 Optical repeater
201 to 204 Loop back circuit
210 FIFO
211 MCF
212 SCF group
214, 215 SCF
250, 260 Optical repeater
301, 302, 311, 312 Optical coupler
303 Optical filter
411, 421 Optical amplifier
412, 413, 422, 423 Optical isolator
413 Optical isolator
500, 600 Optical repeater
501, 502 Optical coupler
511, 512 Optical power meter
531, 532 Optical interface
533, 534 Optical filter
535, 536 Termination unit
602 Optical processing circuit
610, 620 Bypass circuit
611, 621 Optical switch
612, 622 Optical coupler
700, 800 MCF transmission path
710, 720 Light source device
711, 712, 721 LD light source
713, 714 Optical circulator
715 Optical switch
716, 722 Optical power meter
717 FIFO
723 FIFO
770 Fusion machine
810, 820 Light source device
821 LD light source
822 Optical power meter
1000, 1100, 1200 Optical transmission system

The invention claimed is:

1. An optical repeater comprising:
a first fan-in/fan-out (FIFO) including a first multi-core fiber (MCF) connectable to a first MCF transmission path and a first SCF (single-core fiber) group including a plurality of SCFs relevantly connected to each core of the first MCF; and a monitoring light circuit that outputs, based on a fixed loss, monitoring light being input to a first core included in the first MCF, from light being output from a first SCF being an SCF included in the first SCF group and being an SCF relevant to the first core.

2. The optical repeater according to claim 1, wherein the monitoring light circuit includes a loop back circuit that loops back, from the first SCF, the monitoring light to a second SCF different from the first SCF of the first SCF group.

3. The optical repeater according to claim 1, further comprising:

a second FIFO including a second MCF connectable to a second MCF transmission path including a multi-core fiber and a second SCF group relevantly connected to each core of the second MCF;

an optical processing circuit that is disposed between the first SCF group and the second SCF group and executes predetermined processing on light propagating through each of a pair of SCFs different in transmission direction from each other; and a loop back circuit that loops back, in a direction of the optical processing circuit toward input of the first FIFO, light being input from the first FIFO to the optical processing circuit and output from the optical processing circuit to the second FIFO.

4. The optical repeater according to claim 2, wherein the loop back circuit loops back only light having a wavelength of the monitoring light.

5. The optical repeater according to claim 1, wherein the monitoring light circuit includes an optical coupler that splits, from the first SCF, the monitoring light propagating through the first SCF and outputs the split monitoring light to outside of the optical repeater.

6. The optical repeater according to claim 5, wherein the optical coupler includes an optical filter that outputs only light having a wavelength of the monitoring light to outside of the optical repeater, and the monitoring light circuit includes an optical interface for connecting the split monitoring light to an optical power meter and a termination unit that reduces, when the optical power meter is not connected to the optical interface, a reflection attenuation amount of the optical interface.

7. The optical repeater according to claim 1, further comprising:

a second FIFO including a second MCF connectable to a second MCF transmission path including a multi-core fiber and a second SCF group relevantly connected to each core of the second MCF; and an optical processing circuit that is disposed between a third SCF being one SCF of the second SCF group and the first SCF and executes predetermined processing on input light, wherein the monitoring light circuit is connectable, based on a fixed loss, between the first SCF and the third SCF by using a bypass circuit bypassing the optical processing circuit.

8. The optical repeater according to claim 7, wherein the monitoring light circuit configures, between the first SCF and the third SCF, the bypass circuit bypassing the optical processing circuit, by using at least one of an optical switch and an optical coupler.

9. An optical transmission system comprising:

an optical repeater including a first fan-in/fan-out (FIFO) including a first multi-core fiber (MCF) connectable to a first MCF transmission path and a first SCF (single-core fiber) group including a plurality of SCFs relevantly connected to each core of the first MCF and a monitoring light circuit that outputs, based on a fixed loss, monitoring light being input to a first core included in the first MCF, from light being output from a first SCF being an SCF included in the first SCF group and being an SCF relevant to the first core;

a light source device including a light source that inputs, via the first MCF transmission path, the monitoring light to the first FIFO, and an optical power meter that measures power of the monitoring light that is looped-back to the first FIFO and propagated through the first MCF transmission path; and a fusion machine that performs optical axis adjustment and fusion splicing between the first MCF transmission path and the first MCF, by using power of the monitoring light measured by the optical power meter.

10. A connection method of an optical repeater, comprising:

inputting monitoring light to a first multi-core fiber (MCF) transmission path of an optical repeater including a first fan-in/fan-out (FIFO) including a first MCF connectable to the first MCF transmission path and a first single-core fiber (SCF) group including a plurality of SCFs relevantly connected to each core of the first MCF, and a monitoring light circuit that outputs monitoring light being input to a first core included in the first MCF, from light being output from a first SCF being an SCF included in the first SCF group and being an SCF relevant to the first core;

measuring power of the monitoring light being output from the monitoring light circuit; and performing, by using the power of the monitoring light, optical axis adjustment to the first MCF transmission path and the first MCF.

* * * * *